(12) United States Patent
Kim

(10) Patent No.: US 8,275,131 B2
(45) Date of Patent: Sep. 25, 2012

(54) IMAGE FORMING APPARATUS AND SECURITY SETTING METHOD THEREOF

(75) Inventor: Jin-hyung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 415 days.

(21) Appl. No.: 12/570,074

(22) Filed: Sep. 30, 2009

(65) Prior Publication Data

US 2010/0104099 A1    Apr. 29, 2010

(30) Foreign Application Priority Data

Oct. 24, 2008  (KR) .................. 10-2008-0104998

(51) Int. Cl.
*H04L 9/00*  (2006.01)

(52) U.S. Cl. ................ 380/51; 726/5; 380/277

(58) Field of Classification Search .................. 726/1–7, 726/11, 14, 16–19, 21, 26–29; 713/168–171; 380/243, 244, 259–262, 270, 274, 277
See application file for complete search history.

(56) References Cited

U.S. PATENT DOCUMENTS

| | | | |
|---|---|---|---|
| 2003/0154380 A1* | 8/2003 | Richmond et al. | 713/182 |
| 2005/0021981 A1* | 1/2005 | Phillips et al. | 713/182 |
| 2005/0114490 A1* | 5/2005 | Redlich et al. | 709/223 |
| 2005/0240959 A1* | 10/2005 | Kuhn et al. | 725/25 |

\* cited by examiner

*Primary Examiner* — Gilberto Barron, Jr.
*Assistant Examiner* — Malcolm Cribbs
(74) *Attorney, Agent, or Firm* — Stanzione & Kim, LLP (57) ABSTRACT

An image forming apparatus and a security setting method thereof, the method including: inputting an encryption key of a wireless network connection of the image forming apparatus; displaying a selection screen including one or more functions which the image forming apparatus provides; and selecting at least one of the displayed functions with which to share the encryption key as a password.

13 Claims, 10 Drawing Sheets

Wireless > Wizard Setup >>
WPA-Personal Security Setup

Selected Wireless network is protected with encryption.
Enter a Network Key for wireless network connection.
Contact the Network Adminstrator if you don't know the Network Key.
WPA-Personal Network Key should be alphanumeric and the length should be between 8 to 63 characters long.
Network Key must match with your wireless network.

WPA Shared Key : [                    ]

[Back] [Next] [Cancel]

If wireless connection fails.

23 —— ⓥ Panel Lock password Enable
　　　ⓥ Printing Disable
　　　○ Scanning Disable

IMAGE FORMING APPARATUS AND SECURITY SETTING METHOD THEREOF

CROSS-REFERENCE TO RELATED APPLICATIONS

This application claims the benefit under 35 U.S.C. §119 (a) of Korean Patent Application No. 10-2008-0104998, filed on Oct. 24, 2008, in the Korean Intellectual Property Office, the disclosure of which is incorporated herein by reference in its entirety.

BACKGROUND

1. Field of the Invention

The present general inventive concept relates to an image forming apparatus and a security setting method thereof, and more particularly, to an image forming apparatus, and a security setting method thereof, to be used in a wireless network connection.

2. Description of the Related Art

An image forming apparatus forms an image on a print medium such as a paper. The image forming apparatus may be implemented as a printer, a photocopier, a facsimile machine, a multifunction device having at least two of such functions, etc.

Recently, the image forming apparatus has been widely used as an office automation device, e.g., a multifunction device performing a scanning function and a facsimile function, in addition to a printing function outputting a document. In this regard, there is a growing tendency to develop the image forming apparatus to have higher performance in order to expand its inherent functions.

The image forming apparatus having such expanded functions may be set to be connected by a wireless network to use within an office. In general, the wireless network supports various encryption methods to reinforce protection of the image forming apparatus vulnerable to security violations.

As one of the encryption methods, the image forming apparatus and a host apparatus wirelessly connected to the image forming apparatus may share a predetermined encryption key and perform mutual certification using the shared encryption key. This method makes data communication by the wireless network available only between those apparatuses sharing the encryption key.

The image forming apparatus may be secured by passwords with respect to the various expanded functions. For example, a panel lock function may be provided to the image forming apparatus with respect to a panel provided as a user input means, making it necessary for a user to input a predetermined password in order to use the panel.

Since the passwords with respect to various functions of the image forming apparatus operate independently of the wireless network connection, processes of setting them are generally performed separately. The conventional image forming apparatus sets the encryption key for the wireless network connection and the passwords required for various functions to be different.

Accordingly, since the user should set a password for each function through a separate process, more time is unnecessarily consumed in the setting processes, and this also forces the user to remember all of the many passwords set for the respective functions, thereby causing inconvenience to the user.

Also, if the encryption key used with the wireless network connection is changed due to security concerns because of divulgence of the existing encryption key, this may make it impossible to connect the image forming apparatus to the wireless network by using the existing encryption key. However, if a user knows a password assigned to each function of the image forming apparatus even in this case, he/she can use the image forming apparatus without restriction, thus causing a security problem due to the unrestricted use thereof.

SUMMARY

Example embodiments of the present general inventive concept may provide an image forming apparatus and a security setting method thereof, wherein an encryption key used in a wireless network connection of the image forming apparatus is shared as a password to perform a function of the image forming apparatus which requires a security setting, thereby conveniently performing a password setting and reducing a user's requirement to remember various passwords.

Another feature of the present general inventive concept is to provide an image forming apparatus and a security setting method thereof, restricting use of partial functions of the image forming apparatus in response to a failure of a wireless network connection, thereby preventing illegal or unauthorized use of the image forming apparatus.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a security setting method of an image forming apparatus, the method including inputting an encryption key of a wireless network connection of the image forming apparatus, displaying a selection screen including one or more functions which the image forming apparatus provides, and selecting at least one of the displayed functions with which to share the encryption key as a password.

The method may include displaying a function restriction setting screen to set use of at least one of the selected functions to be restricted according to failure of the wireless network connection using the encryption key.

The method may include displaying the selected functions which share the encryption key, the functions which are restricted according to the failure of the wireless network connection, or any combination thereof.

The functions of the image forming apparatus may be associated with printing, scanning, an embedded web server (EWS) connection, use of operation panel (OPE), a communication protocol type, an access to a storing unit, user authentication, or any combination thereof.

The method may include changing the shared encryption key and/or the password of the selected functions, and displaying that the sharing of the encryption key as the password is ended according to the changing.

The foregoing and/or other features and utilities of the present general inventive concept may also be achieved by providing an image forming apparatus, including a user interface which receives an encryption key of a wireless network connection of the image forming apparatus, a display unit which displays a selection screen including one or more functions which the image forming apparatus provides, and a control unit which sets, in response to at least one of the displayed functions being selected through the user interface, the at least one selected function to share the input encryption key as a password.

The display unit may display a function restriction setting screen to set use of at least one of the selected functions to be restricted according to failure of if the wireless network connection using the encryption key fails.

The display unit may display the selected functions which share the encryption key, the functions which are restricted according to the failure of the wireless network connection, or any combination thereof.

The functions of the image forming apparatus may be associated with printing, scanning, an embedded web server (EWS) connection, use of operation panel (OPE), a communication protocol type, an access to a storing unit, a user authentication, or any combination thereof.

The user interface may change the shared encryption key and/or the password of the selected function, and the display unit may display that the sharing of the encryption key as the password is ended according to the changing.

The foregoing and/or other features and utilities of the present general inventive concept may also be achieved by providing a security setting method of an image forming apparatus, the method including inputting an encryption key of a wireless network connection of the image forming apparatus, and setting the input encryption key to be shared with at least one function which the image forming apparatus provides.

The method may include displaying a setting result.

The foregoing and/or other features and utilities of the present general inventive concept may also be achieved by providing an image forming apparatus, including a user interface which inputs an encryption key of a wireless network connection of the image forming apparatus, and a control unit which sets the input encryption key to be shared with at least one function which the image forming apparatus supplies.

The image forming apparatus may include a display unit which displays a setting result.

The foregoing and/or other features and utilities of the present general inventive concept may also be achieved by providing a recording medium having recorded thereon a computer program to control a computer to perform a security setting method of an image forming apparatus, the method including inputting an encryption key of a wireless network connection of the image forming apparatus, and setting the input encryption key to be shared with at least one function which the image forming apparatus provides.

The foregoing and/or other features and utilities of the present general inventive concept may also be achieved by providing a method of setting security of an image forming apparatus, the method including setting an encryption key used to wirelessly connect the image forming apparatus to a network as a password of a function of the image forming apparatus, and performing the function in response to the password being provided by a user.

The method may further include displaying the function to a user to be selected to have the password assigned.

The user may select the function to which the password is assigned.

A control unit of the image forming apparatus may select the function to which the password is assigned.

Another device connected to the network may select the function to which the password is assigned.

The method may further include setting use of the function to be restricted in response to a failure of a wireless connection of the image forming apparatus.

The method may further include notifying a user that use of the function is restricted in response to a failure of a wireless connection of the image forming apparatus.

The foregoing and/or other features and utilities of the present general inventive concept may also be achieved by providing an image forming apparatus including a setting circuit to set an encryption key used to wirelessly connect the image forming apparatus to a network as a password of a function of the image forming apparatus, and a control circuit to perform the function in response to the password being provided by a user.

The image forming apparatus may further include a restriction circuit to restrict use of the function in response to a failure of a wireless connection of the image forming apparatus.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Reference will now be made in detail to various exemplary embodiments of the present general inventive concept, examples of which are illustrated in the accompanying drawings, wherein like reference numerals refer to like elements throughout. The exemplary embodiments are described below in order to explain the present general inventive concept by referring to the figures.

Figure 1A:
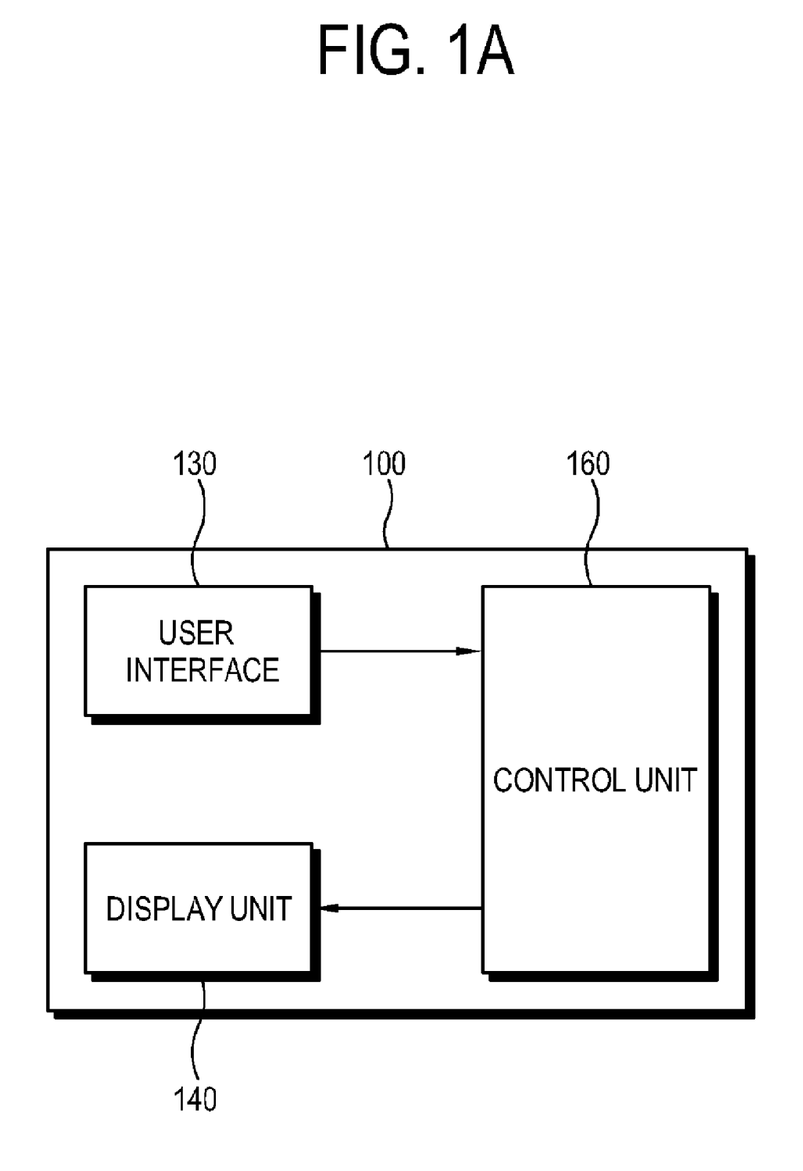
FIGS. 1A, 1B and 2 are block diagrams each illustrating a configuration of an image forming apparatus according to an exemplary embodiment of the present general inventive concept.
Figure 1B:
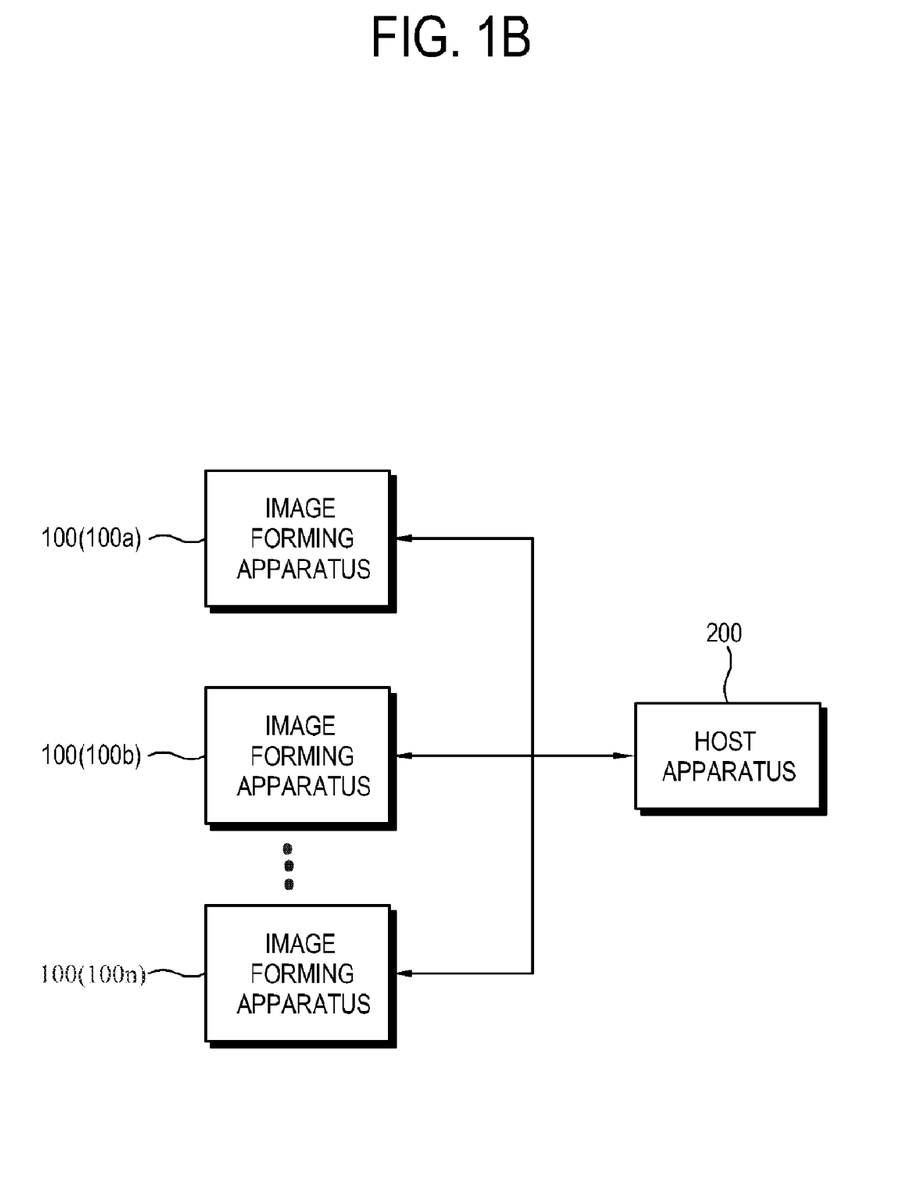
Figure 2:
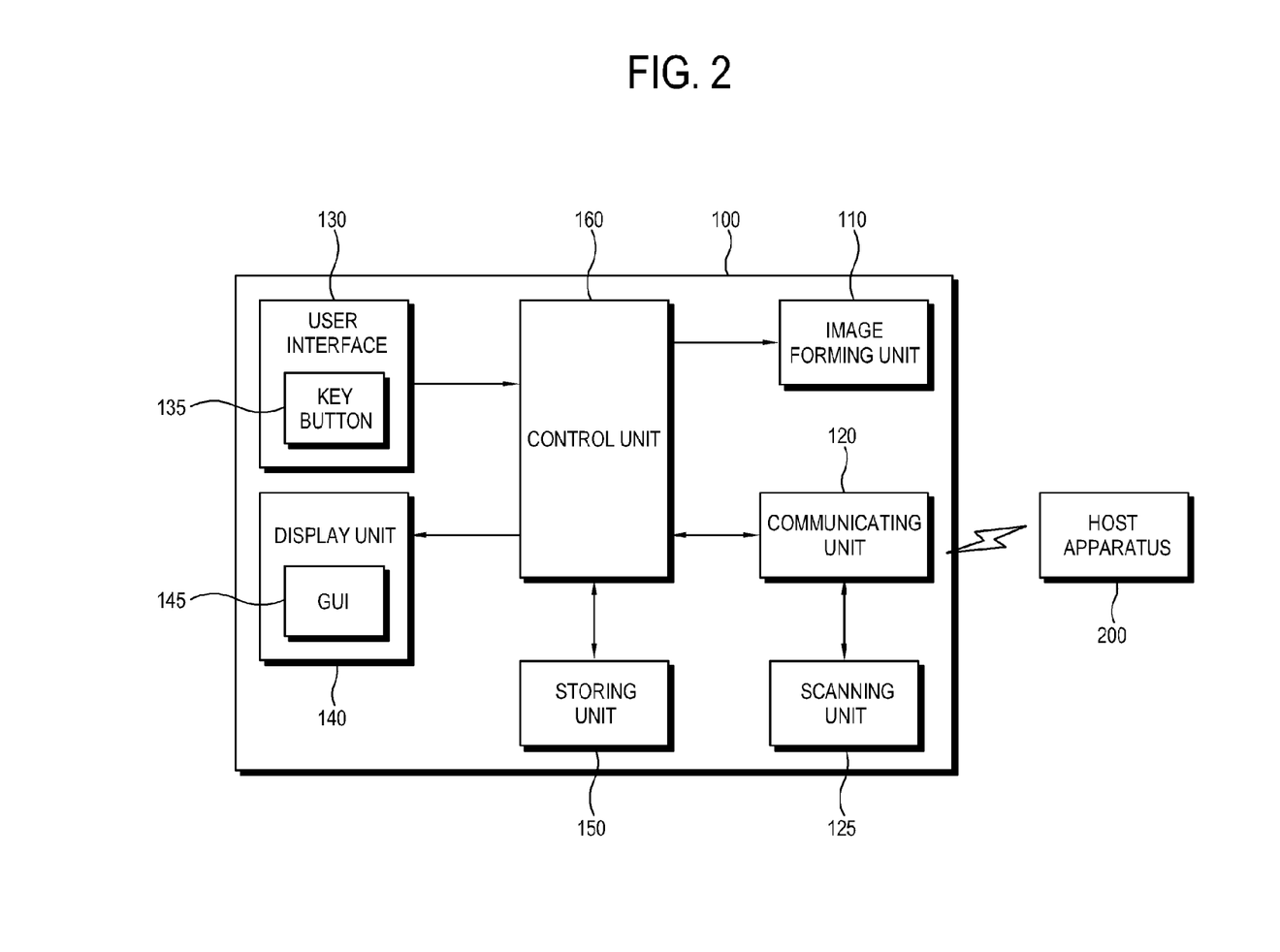

FIGS. 1A, 1B and 2 are block diagrams each illustrating a configuration of an image forming apparatus 100 according to an exemplary embodiment of the present general inventive concept. The image forming apparatus 100 according to the present exemplary embodiment may be implemented as a printer, a photocopier, a facsimile machine, a multifunction device having two or more of such functions, etc., or any combination thereof.

The image forming apparatus 100 of the present exemplary embodiment may be connectable with external apparatuses such as a host apparatus 200, a server, etc., by a wireless network. Here, the wireless network may be implemented as one of various wireless communication networks such as a wireless local area network (LAN), bluetooth, etc.

As illustrated in FIG. 1A, the image forming apparatus 100 may include a user interface 130, a display unit 140 and a control unit 160. The image forming apparatus 100 may further include an image forming unit 110, a communicating unit 120 and a storing unit 150, as illustrated in FIG. 2.

As illustrated in FIG. 1B, there may be a plurality of image forming apparatuses 100 (100a, 100b, . . . 100n) wirelessly connected to the host apparatus 200. The plurality of image forming apparatuses 100 (100*a*, 100*b*, . . . , 100*n*) may use different encryption keys to wirelessly connect to the host apparatus 200.

If a printing command is input, the image forming unit 110 may form an image to be printed on at least one print medium based on printing data. There are several possibilities which may serve as a source of the printing data that is to be printed. Examples may include, according to the printing command, a document to be copied after scanning, received facsimile data to be printed, printing data received externally from another image forming apparatus 100, printing data received externally through the host apparatus 200, which may include a server, printing data stored in an internal memory (such as a hard disk drive) or an external memory (such as a universal serial bus (USB)) of the image forming apparatus, etc.

The communicating unit 120 may perform data communication using a wireless network with an external apparatus including the host apparatus 200 and a server. More particularly, the communicating unit 120 may include at least one communication module to perform wireless communication according to encryption types such as a wired equivalent privacy (WEP) defined in IEEE 802.11, a temporal key integrity protocol (TKIP) or an advanced encryption standard (AES), etc., used in a wi-fi protected access (WPA, WPA2) supporting safer security, and so on.

For example, if the communicating unit 120 is configured to include a communication module using the WPA type, the image forming apparatus 100 may perform mutual certification with the communication module, using a key value input as a pre-shared key of the WPA, and may encrypt a packet used in data communication to transmit and receive, using a new key value generated as a result of the mutual certification. Accordingly, the wireless network of the WPA type enables data communication between stations knowing the pre-shared key value.

In the present exemplary embodiment, the image forming apparatus 100 and an external apparatus wirelessly connectable with the image forming apparatus 100, such as the host apparatus 200, are described to have a pre-shared key as predetermined and to connect to a predetermined access point, to thereby perform wireless data communication.

The communication unit 120 according to the present exemplary embodiment may further include a wired communication module connectable to a local connection or a wired network through a predetermined protocol, or a USB port connectable with a portable storage medium such as a USB memory. Also, the communicating unit 120 may further include a facsimile communication module to convert scan data scanned by a scanning unit 125 to a facsimile signal to transmit the converted scan data to, or to receive a facsimile signal from, outside of the image forming apparatus 100. Although the scanning unit 125 is illustrated as being an integrated part of the image forming apparatus 100 in FIG. 2, the communicating unit 120 may also receive scan data from outside the image forming apparatus 100, or exclusively from outside the image forming apparatus 100.

The communicating unit 120 may perform a "scan to host" function or a "scan to server" function to transmit scan data scanned by the scanning unit 125 to the host apparatus 200 or the server according to a predetermined protocol, or may transmit the scan data to the outside through a "scan to e-mail" function, etc.

The user interface 130 may receive a command from a user. The user interface 130 may include a key button 135 (hereinafter also referred to as a "hard key", or "key pad") provided on the image forming apparatus 100, or a graphic user interface (GUI) 145 generated by execution of a printer driver or a separate application and displayed on the display unit 140 to allow the user to input commands/selections along with or without the key button 135.

Although FIG. 2 illustrates the user interface 130 and display unit 145 as including the key button 135 and GUI 145, it is possible that the key button 135 and/or GUI 145 can be disposed away from the image forming apparatus 100, and may be respectively connected to the user interface 130 and display unit 140, and/or the control unit 160, through a wired or wireless connection.

The user interface 130 of the image forming apparatus 100 of the present exemplary embodiment may receive an encryption key to be used in a wireless network connection of the image forming apparatus 100, that is, a pre-shared key, and may select at least one function of the image forming apparatus 100 with which to share the pre-shared key to be used as a password in a security setting.

Also, the user interface 130 may select a function of the image forming apparatus 100 of which the use may be restricted in the case in which the wireless network connection of the image forming apparatus 100 fails.

The image forming apparatus 100 may use the predetermined pre-shared key to perform identification and determine permission of the function at the time of the wireless network connection.

The display unit 140 may display a setting state and an operating state of the image forming apparatus 100 to the user, or may display the GUI screen 145 (including a security setting screen) to receive various commands from the user. The display unit 140 may include a thin film transistor-liquid crystal display (TFT-LCD) and a driving unit (not shown) to drive the TFT-LCD.

It is possible that the host apparatus 200 communicates with the control unit 160 through the communicating unit 120 to control the user interface 130, display unit 140, image forming unit 110, and storing unit 150 to perform one or more functions thereof.

Figure 3A:
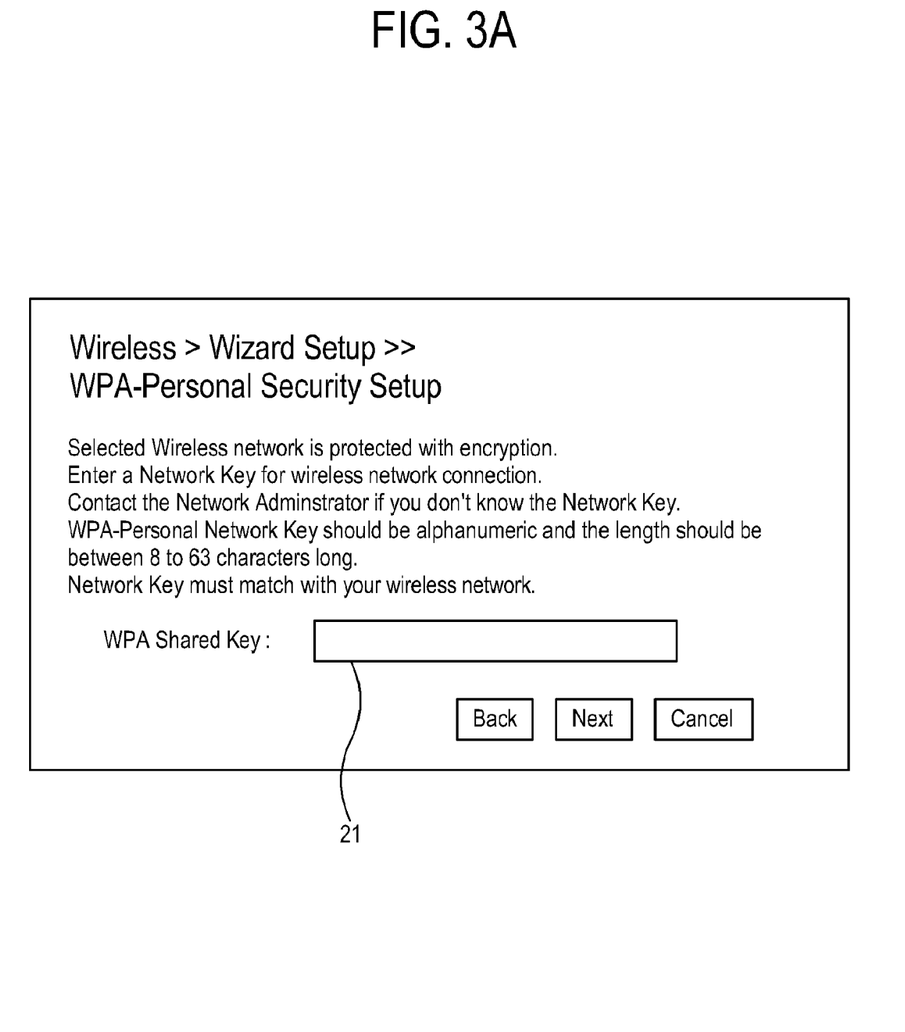
FIGS. 3A to 3C illustrate security setting screens of the image forming apparatus according to an exemplary embodiment of the present general inventive concept.
Figure 3B:
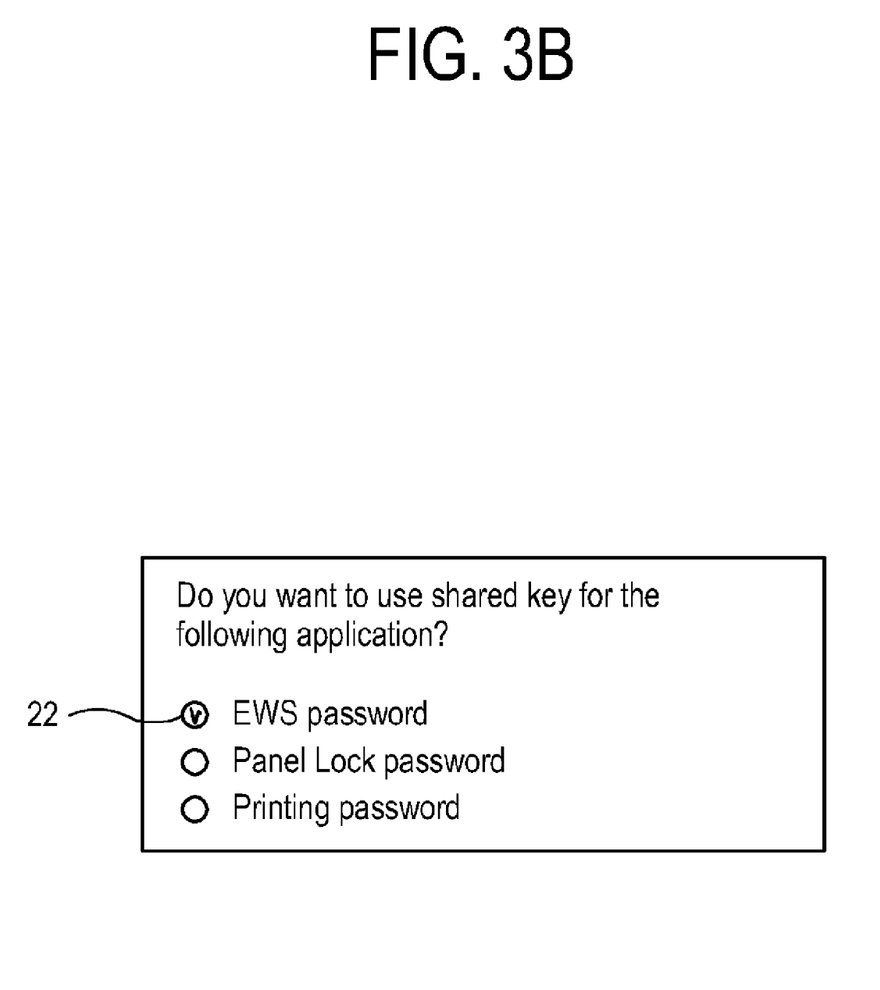
Figure 3C:
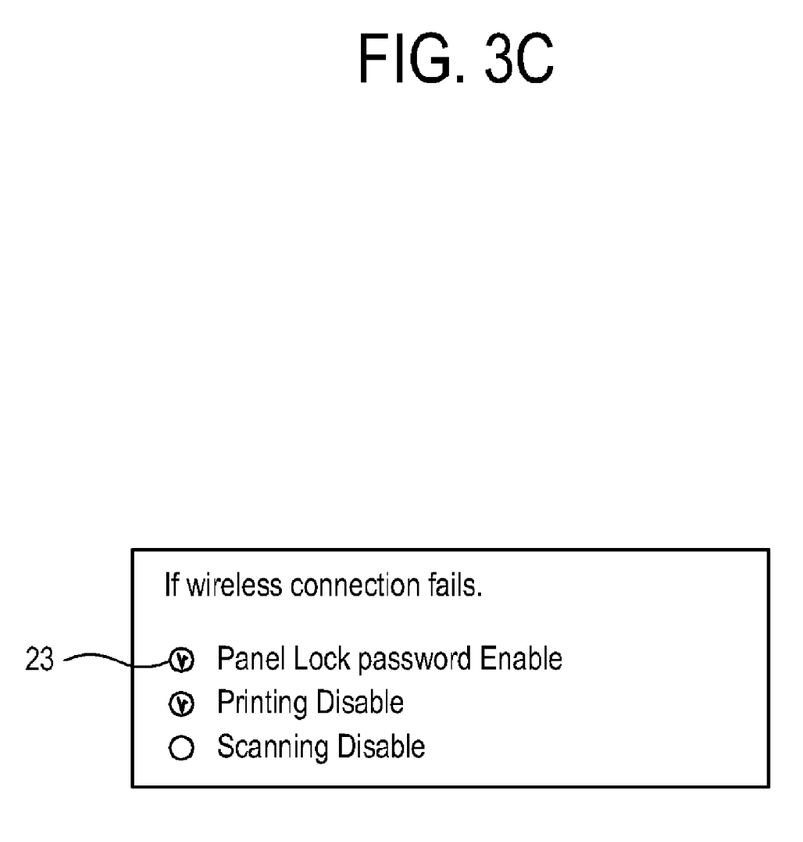

FIGS. 3A to 3C illustrate security setting screens of the image forming apparatus 100 according to an exemplary embodiment of the present general inventive concept.

As illustrated in FIG. 3A, the control unit 160 may control the display unit 140 to display a wireless network setting screen to use in inputting an encryption key (i.e., a pre-shared key) as a security setting screen. The control unit 160 may control the display unit 140 to display the screens of FIGS. 3A to 3C due to a prompt from a user through the user interface 130, a signal from the host apparatus 200, a signal relayed through the host apparatus 200 from another network connected device, etc. The displayed wireless network setting screen may include an input field 21 to input the encryption key therein.

If the user inputs the encryption key, which may include predetermined numbers or characters, in the setting screen illustrated in FIG. 3A, the control unit 160 may control the display unit 140 to display a selection screen used to share the input encryption key and apply the input encryption key as a password to use a function of the image forming apparatus 100 which requires a security setting, as illustrated in FIG. 3B. Referring to FIG. 3B, the displayed selection screen may include a check area 22 by which a user may select at least one function of the image forming apparatus 100. One or more such functions of the image forming apparatus 100 which require a security setting may be displayed in the displayed selection screen, so that a user may select more than one such function from the same selection screen.

If at least one function of the image forming apparatus 100 is selected by the user in the selection screen illustrated in FIG. 3B, the display unit 140 may display a result of the selection. In other words, upon selection by the user of one of the functions illustrated in FIG. 3B, the check area 22 may include a marking such as a check to indicate that the item has been selected.

Also, as illustrated in FIG. 3C, the display unit 140 may display a function restriction setting screen of the image forming apparatus 100 to indicate restricted use of a function of the image forming apparatus 100. More particularly, the display unit 140 displays a screen to allow the user to restrict the use of one or more functions of the image forming apparatus 100 in the event that the wireless network connection to the image forming apparatus fails. Referring to FIG. 3C, the displayed selection screen may include a check area 23 to select at least one such function of the image forming apparatus 100 to be thusly restricted.

The one or more functions of the image forming apparatus 100 displayed in the selection screens illustrated in FIGS. 3B and 3C may be functions requiring a security setting requiring a password. The functions, a plurality of which are exemplarily illustrated in FIGS. 3B and 3C, may include an embedded web server (EWS) connection through an external apparatus, an operation panel (OPE) usage as the user interface 130, that is, an input provided in the image forming apparatus 100, a communication protocol type with an external apparatus such as a server message block (SMB), a file transfer protocol (FTP), a simple network management protocol (SNMP), a lightweight directory access protocol (LDAP), an e-mail (for example, a scan to e-mail) access to a storing unit (HDD) of the image forming apparatus 100 by a local connection or a wire network, etc., authentication of the user who wants to perform various ones of these functions by using the image forming apparatus 100, as well as an image forming function such as printing, scanning, etc. Various functions of the image forming apparatus 100 may be added depending on function expansion of the image forming apparatus 100.

Also, the displaying order of the selection and setting screens in FIGS. 3B and 3C may be changed, or only one of the functions may be displayed.

The storing unit 150 may store various setting values input by a user through the user interface in response to the screens displayed in FIGS. 3A to 3C. For example, if a key value of the WPA is input by the user, for example through the key button 135 of the user interface 130 or the GUI 145 of the display unit 145, as an encryption key used in the wireless network connection, the control unit 160 may control the storing unit 150 to store the corresponding value of the key. Also, if an application corresponding to a function of the image forming apparatus 100 selected in FIG. 3B or 3C is to be executed, the image forming apparatus 100 may authenticate the user by using the stored key value, and may perform the corresponding operation.

The storing unit 150 may include an internal storage medium such as an HDD, external or portable storage mediums such as a USB memory and a memory card (a memory stick, a compact flash (CF) card, a multimedia card (MMC)), etc., or any combination thereof. Also, the storing unit 150 may further store printing data received from the outside, a scan image generated by the scanning unit 125 or received from an outside scanning source, etc.

The control unit 160 may fully control the image forming apparatus 100. More particularly, the control unit 160 may execute an application of a wireless network setting to display the setting screen (referring to FIG. 3A) to receive an encryption key, and may control the display unit 140 to display the selection screen (referring to FIG. 3B) to be used to select a function of the image forming apparatus 100, which requires a security setting and which may share the input encryption key as a password to use the function, if the encryption key of the wireless network connection is input through the user interface 130.

If the user selects at least one function of the image forming apparatus 100 to share the encryption key as the password, through the user interface 130 in the displayed selection screen such as that illustrated in FIG. 3B, the control unit 160 may set the input encryption key to be used as the password of the selected at least one function of the image forming apparatus 100. The control unit 160 may control the display unit 140 to display the selection result to the user.

According to another exemplary embodiment of the present general inventive concept, if an encryption key of the wireless network connection is input, such as by a user through the key button 135 of the user interface 130, the control unit 160 may set the input encryption key to be shared as a password of at least one function which the image forming apparatus 100 provides, without the selection of the particular function by the user in the manner illustrated in FIG. 3B. That is, in this alternate embodiment, if the encryption key is input to the image forming apparatus 100, the control unit 160 may set, without further user input, the input encryption key to be the password of one or more functions of the image forming apparatus 100 requiring a security setting.

The control unit 160 may display the setting result of sharing the encryption key with a function of the image forming apparatus 100 without input by the user, as described above, to the user through the display unit 140.

Also, the control unit 160 may control the display unit 140 to display the function restriction setting screen (referring to FIG. 3C) of the image forming apparatus 100 to the user so that the user may restrict use of one or more functions of the image forming apparatus 100 in a situation in which the wireless network connection of the image forming apparatus 100 using the input encryption key fails.

If the user selects at least one function of the image forming apparatus 100 of which the use is to be restricted through the user interface 130 in the displayed function restriction setting screen of FIG. 3C, the control unit 160 may block the user from using the selected at least one function of the image forming apparatus 100 if the wireless network connection fails. The control unit 160 may control the display unit 140 to display the setting result to the user.

In other words, if the user has selected one or more of the functions of the image forming apparatus 100 to be restricted in the case in which the wireless network connection fails, the selected one or more functions will not be available to the user even if the user has entered the correct shared password if the image forming apparatus 100 is not able to complete the wireless network connection.

If one or more of the functions of the image forming apparatus are selected to be restricted in the case of a failed wireless network connection, the control unit 160 may control the display unit 140 to concurrently display the selection result of the functions of the image forming apparatus 100 sharing the encryption key, and the result of the setting of the functions of the image forming apparatus 100 which are to be restricted in the case of the failed wireless network connection.

In the case in which an encryption key has been set to be shared as a password, in other words set so as to also be used as a password of a predetermined function of the image forming apparatus 100, the user may change the shared encryption key and/or the password. According to this change, the control unit 160 may change setting information of the storing unit 150 to release the sharing of the encryption key and the password, and may control the display unit 140 to display the release of the sharing of the encryption key to the user.

As described above, if the encryption key is set to be shared as a password used with at least one function of the image forming apparatus 100, the control unit 160 uses the encryption key to connect to the wireless network to use the image forming apparatus 100. Also, if the user wishes to use at least one function of the image forming apparatus 100 which shares the encryption key as a password, the control unit 160 may receive the pre-shared password through the user interface 130, and may accordingly perform the corresponding function.

Also, if one or more functions of the image forming apparatus 100 have been set so as to be restricted from use in a case in which the wireless network connection fails, the control unit 160 may determine whether the wireless network connection using the encryption key is successful, and accordingly may restrict the use of the restricted one or more functions of the image forming apparatus 100 if the wireless network connection is not successful, and may display results of the restriction to the user through the display unit 140.

Hereinafter, a security setting process and a control process depending on a security setting of the image forming apparatus 100 according to an exemplary embodiment of the present general inventive concept will be described referring to FIGS. 4 to 7.

Figure 4:
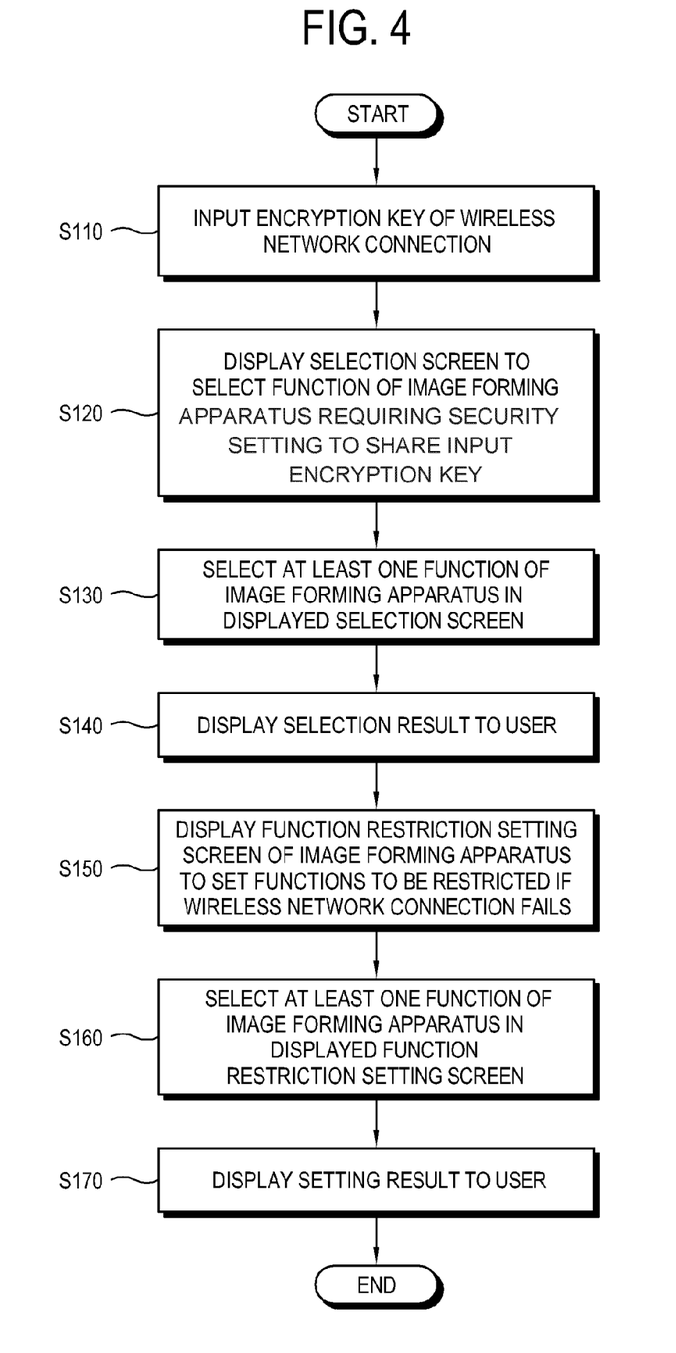
FIG. 4 is a flowchart illustrating a security setting process according to an exemplary embodiment of the present general inventive concept.

FIG. 4 is a flowchart illustrating a security setting process according to an exemplary embodiment of the present general inventive concept.

Referring to FIG. 4, in operation S110 a user (or an administrator) may input an encryption key used in a wireless network connection through the user interface 130 as a wireless network setting process of the image forming apparatus 100. Here, the encryption key may be a pre-shared key of a wi-fi protected access (WPA). This WPA access is merely used as an example, as it is possible that any of several other protocols of wireless connections may also be employed.

If the encryption key is input in operation S110, in operation S120 the image forming apparatus 100 may display a selection screen through which one or more functions of the image forming apparatus 100 which require a security setting may be selected to share the input encryption key S120 as a password.

In operation S130 the user may select at least one of the displayed functions in the selection screen displayed in operation S120 to share the encryption key. In other words, the user may select one or more of the displayed functions which will use the shared encryption key as a password.

In operation S140 the control unit 160 may display the selection result of operation S130 to the user through the display unit 140.

Alternatively, the image forming apparatus 100 according to the present general inventive concept may set the encryption key input in operation S110 to be a password of one or more functions of the image forming apparatus 100 which require a security setting without selection by the user. In other words, the encryption key may be set as the password of the one or more functions with no input from the user. If the encryption key is set to be shared without the selection being performed by the user, the control unit 160 may control the display unit 140 to display the results of the password setting to the user.

In operation S150 image forming apparatus 100 may display a function restriction setting screen of the image forming apparatus 100 so that a user may select one or more functions of the image forming apparatus 100 which will be restricted from use if the wireless network connection of the image forming apparatus 100 using the encryption key input in operation S110 fails.

In operation S160 the user may select at least one function of the image forming apparatus 100 in the function restriction setting screen displayed in operation S150.

In operation S170 the control unit 160 may display the selection result of operation S160 to the user through the display unit 140 S170.

The one or more functions of the image forming apparatus 100 selected or set in operations S130 or S160 may be associated with printing, scanning, embedded web server (EWS) connection, use of an operation panel (OPE), a communication protocol type, an access to the storing unit, a user authentication, etc. The displaying order of the screens in operations S120 and S150 may be changed, or only one of the two may be displayed. Alternatively, the display processes in operations S140 and S170 may be concurrently performed.

Figure 5:
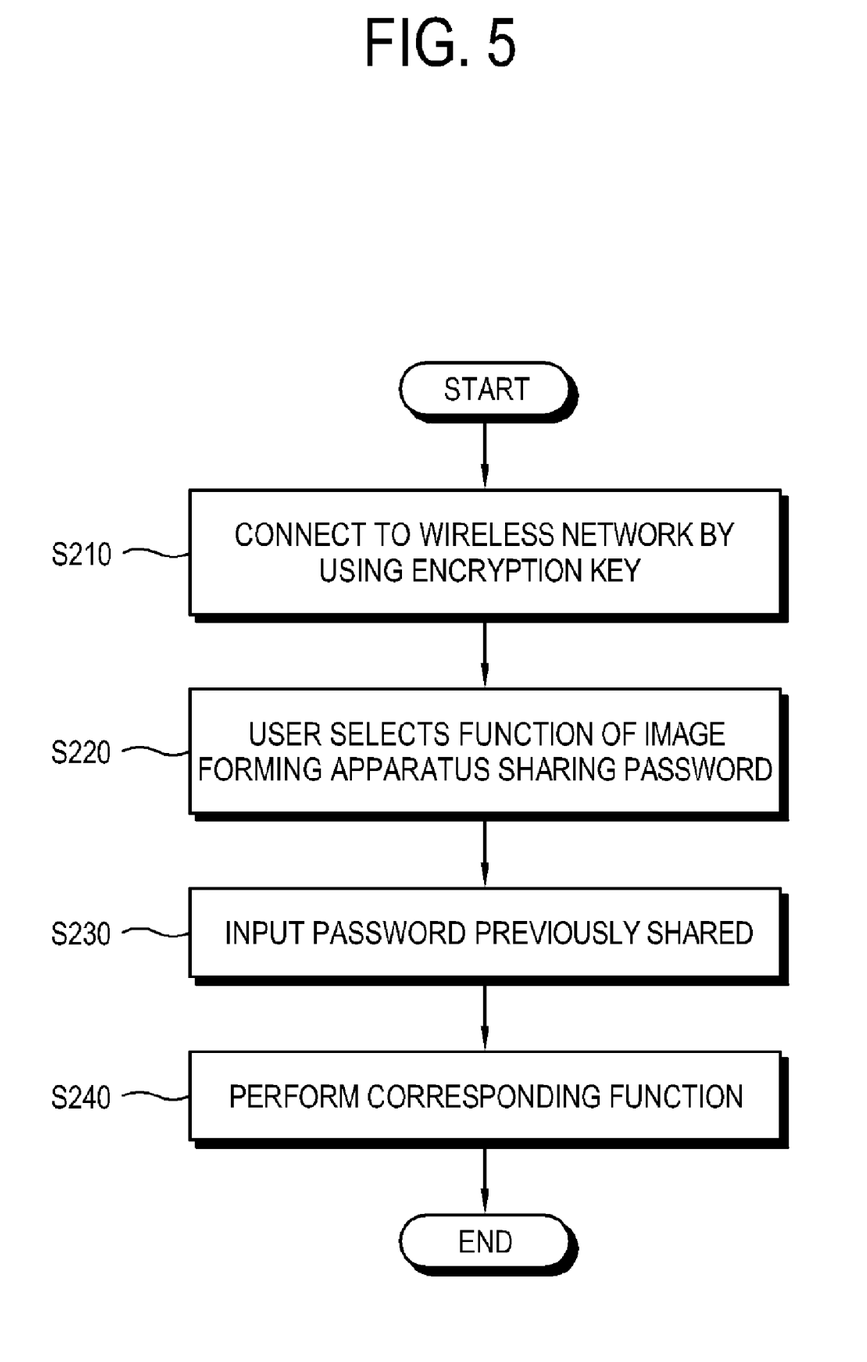
FIGS. 5 and 6 are flowcharts illustrating operations of the image forming apparatus depending on the security setting according to an exemplary embodiment of the present general inventive concept.
Figure 6:
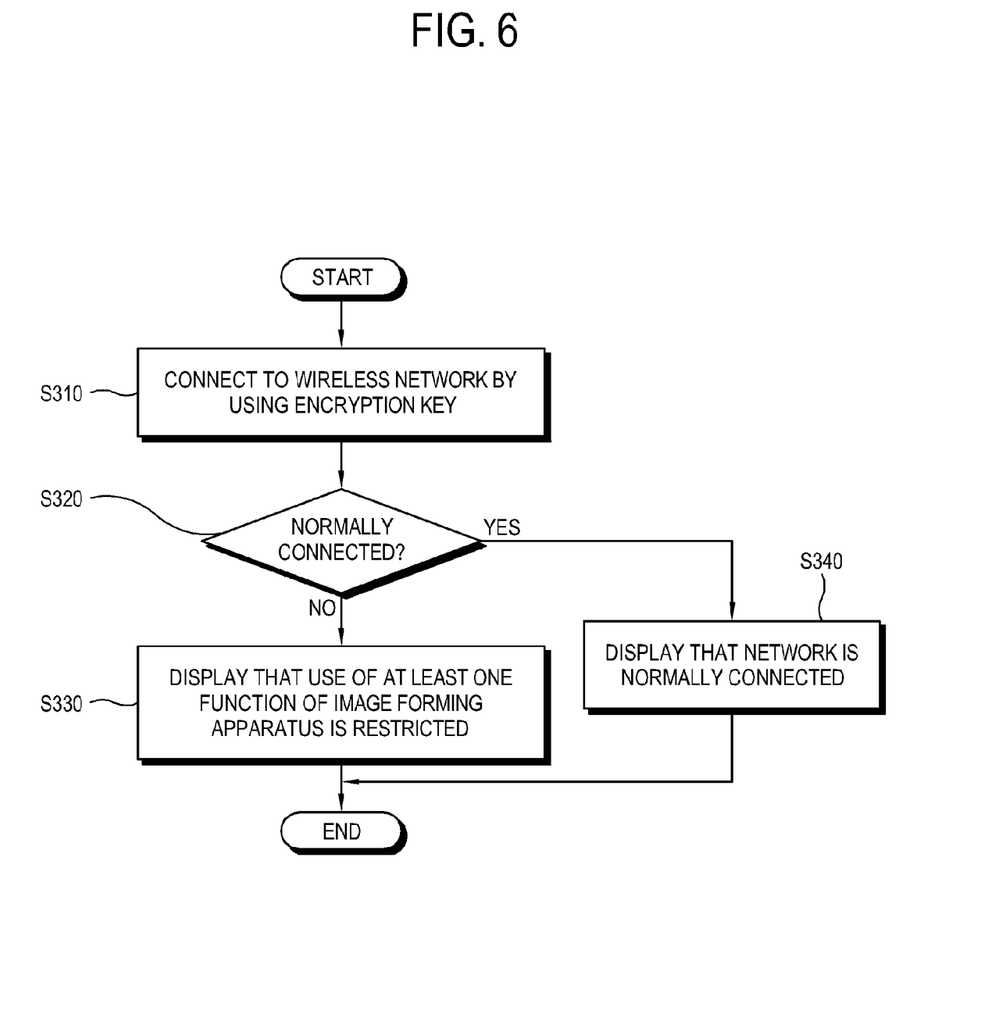

FIGS. 5 and 6 are flowcharts illustrating operating processes of the image forming apparatus 100 depending on the security setting according to an exemplary embodiment of the present general inventive concept.

In operation S210, as illustrated in FIG. 5, the image forming apparatus may be connected to a wireless network using an encryption key which may be predetermined.

In operation S220 a user may select at least one function of the image forming apparatus 100 that has been previously selected to share the encryption key as a password when the image forming apparatus 100 is connected to the wireless network in operation S210.

In operation S230 the user may input the shared password using the user interface 130. In other words, the user may input the encryption key that has been determined to also serve as the password of the selected function.

In operation S240 the control unit 160 may authenticate the password input in operation S230, and may perform the corresponding function.

In operation S310, as illustrated in FIG. 6, the image forming apparatus 100 may be connected to a wireless network using an encryption key which may be predetermined.

In operation S320 the control unit 160 may determine whether the wireless network connection in operation S310 is successful.

If the wireless network connection is determined to have failed in operation S320, in operation S330 the control unit 160 may restrict use of the function which shares the encryption key as a password, and may control the display unit 140 to display that the at least one function of the image forming apparatus 100 which shares the encryption key as a password may not be used.

If the wireless network connection is determined to be successful in operation S320, in operation S340 the control unit 160 may control the display unit 140 to display that the network is normally connected S340.

Figure 7:
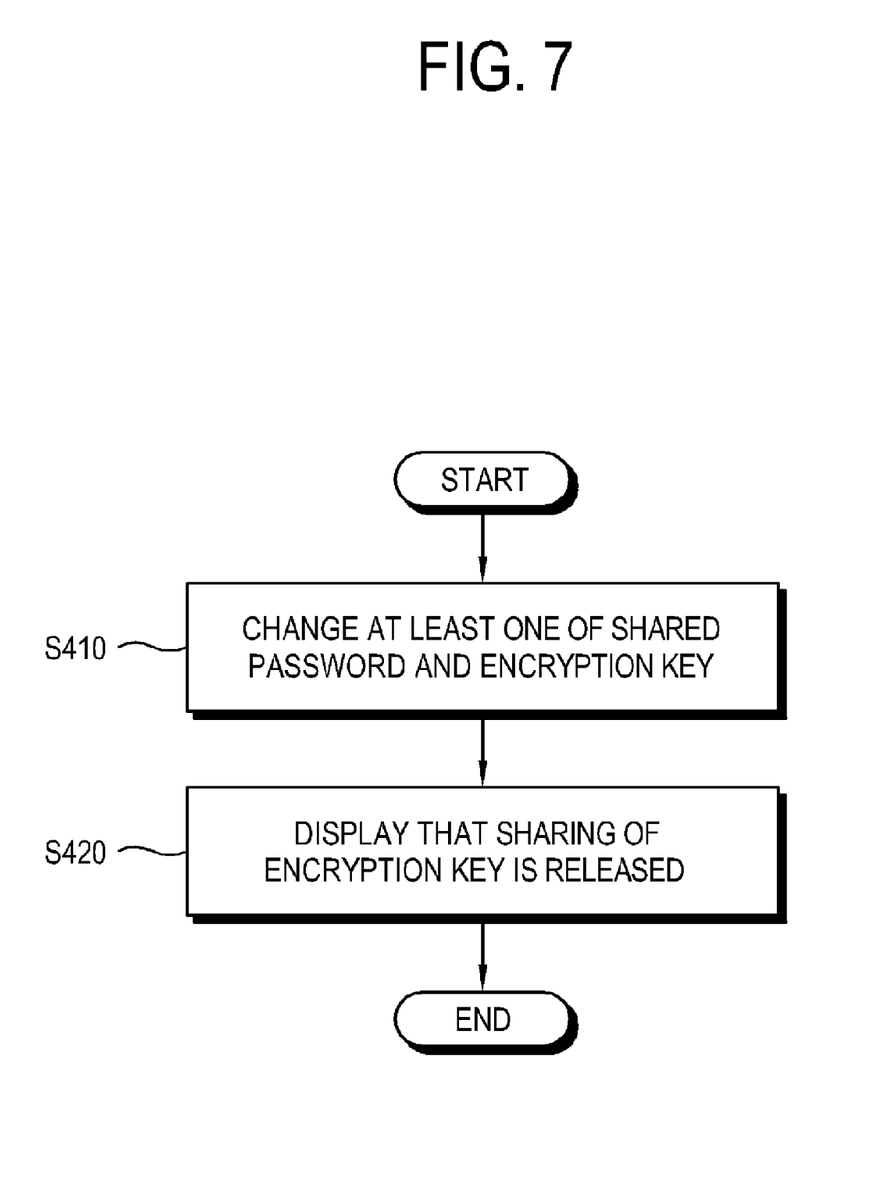
FIG. 7 is a flowchart illustrating a change in a security setting of the image forming apparatus according to an exemplary embodiment of the present general inventive concept.

FIG. 7 is a flowchart illustrating a change in a security setting of the image forming apparatus 100 according to an exemplary embodiment of the present general inventive concept.

As illustrated in FIG. 7, when an encryption key is determined to be shared as the password of at least one function of the image forming apparatus 100, in operation S410 the user may change the shared encryption key and/or the password through the user interface 130.

In operation S420 control unit 160 may change setting information stored in the storing unit 150 to release the sharing of the encryption key, and may control the display unit 140 to display that the sharing of the encryption key is released.

Accordingly, the image forming apparatus 100 according to an exemplary embodiment of the present general inventive concept can conveniently set an encryption key of a wireless network connection to also be a password of a function of the image forming apparatus 100 which requires a security setting, and can reduce the number of passwords that a user must commit to memory or otherwise use. Also, if the wireless network connection fails, partial functions of the image forming apparatus 100 can be prevented from being used, thereby preventing an illegal use of the image forming apparatus 100, and it is possible to set the sharing and/or release of the encryption key as a password according to a user selection.

As described above, an image forming apparatus and a security setting method thereof according to the present general inventive concept share an encryption key of a wireless network connection of the image forming apparatus and apply it as a password of a function of the image forming apparatus which requires a security setting, thereby conveniently performing a password setting and reducing the number of various passwords that a user must commit to memory or otherwise use.

Also, if a wireless network connection fails, the use of partial functions of the image forming apparatus may be restricted, thereby preventing illegal or unauthorized use of the image forming apparatus.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A security setting method of an image forming apparatus, the method comprising:
    inputting an encryption key of a wireless network connection of the image forming apparatus;
    displaying a selection screen including one or more functions which the image forming apparatus provides;
    selecting at least one of the displayed functions with which to share the encryption key as a password;
    changing the shared encryption key and/or the password of the selected functions; and
    displaying that the sharing of the encryption key as the password is ended according to the changing.

2. The method of claim 1, further comprising:
    displaying a function restriction setting screen to set use of at least one of the selected functions to be restricted according to failure of the wireless network connection using the encryption key.

3. The method of claim 2, further comprising:
    displaying the selected functions which share the encryption key, the functions which are restricted according to the failure of the wireless network connection, or any combination thereof.

4. The method of claim 1, wherein the functions of the image forming apparatus are associated with printing, scanning, embedded web server (EWS) connection, use of operation panel (OPE), communication protocol type, an access to a storing unit, user authentication, or any combination thereof.

5. An image forming apparatus, comprising:
    a user interface configured to receive an encryption key of a wireless network connection of the image forming apparatus;
    a display unit configured to display a selection screen including one or more functions which the image forming apparatus provides; and
    a control unit configured to set, in response to at least one of the displayed functions being selected through the user interface, the at least one selected function to share the input encryption key as a password,
    wherein the user interface changes the shared encryption key and/or the password of the selected functions, and
    wherein the display unit displays that the sharing of the encryption key as the password is ended according to the changing.

6. The image forming apparatus according to claim 5, wherein the display unit displays a function restriction setting screen to set use of at least one of the selected functions to be restricted according to failure of the wireless network connection using the encryption key.

7. The image forming apparatus according to claim 6, wherein the display unit displays the selected functions which share the encryption key, the functions which are restricted according to the failure of the wireless network connection, or any combination thereof.

8. The image forming apparatus according to claim 5, wherein the functions of the image forming apparatus are associated with printing, scanning, embedded web server (EWS) connection, use of operation panel (OPE), a communication protocol type, an access to a storing unit, user authentication, or any combination thereof.

9. A security setting method of an image forming apparatus, the method comprising:
    inputting an encryption key of a wireless network connection of the image forming apparatus;
    setting the input encryption key of the wireless network to be shared with at least one function which the image forming apparatus provides; and
    displaying that the sharing of the encryption key as the password is ended according to the setting.

10. A method of setting security of an image forming apparatus, the method comprising:
    setting an encryption key used to wirelessly connect the image forming apparatus to a network as a password of a function of the image forming apparatus;
    displaying the function to a user to be selected to have the password assigned;

performing the function in response to the password being provided by a user; and notifying a user that use of the function is restricted in response to a failure of a wireless connection of the image forming apparatus, wherein a user selects the function to which the password is assigned.

11. The method of claim 10, wherein a control unit of the image forming apparatus selects the function to which the password is assigned.

12. The method of claim 10, wherein another device connected to the network selects the function to which the password is assigned.

13. The method of claim 10, further comprising:

setting use of the function to be restricted in response to a failure of a wireless connection of the image forming apparatus.

* * * * *